March 12, 1935. J. H. WAGENHORST 1,994,375
VEHICLE WHEEL
Original Filed Aug. 4, 1927
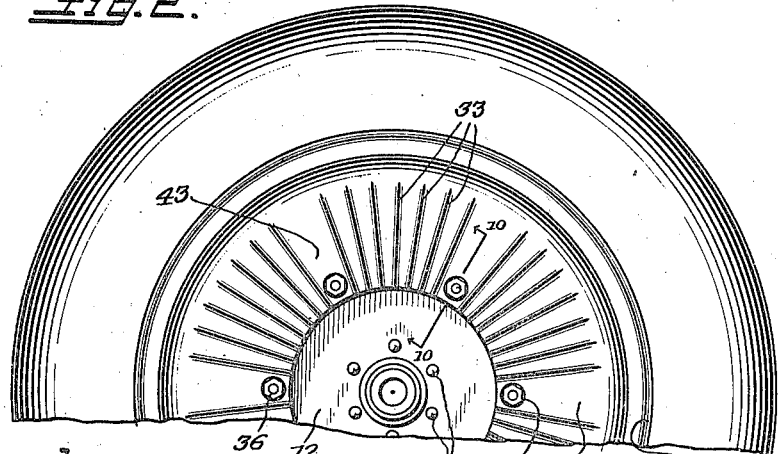
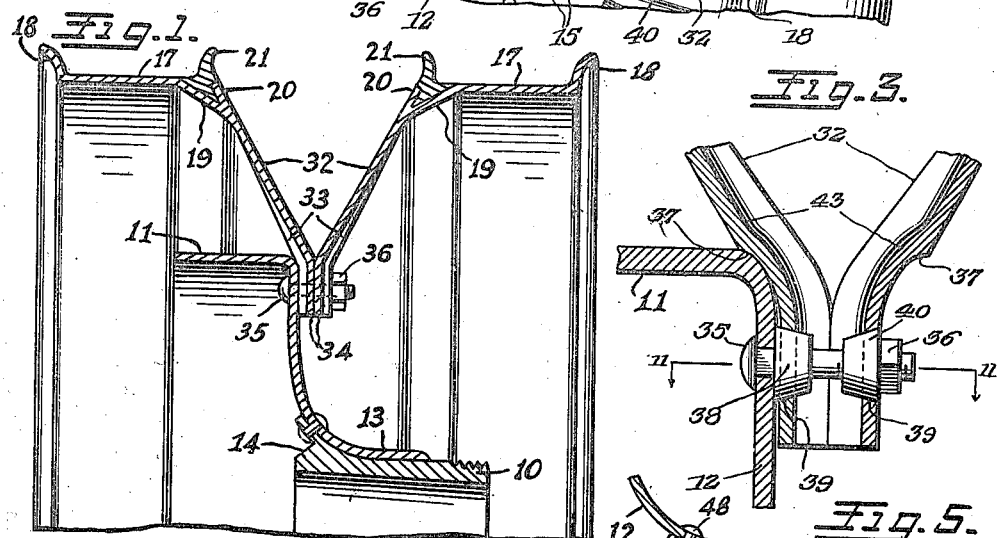
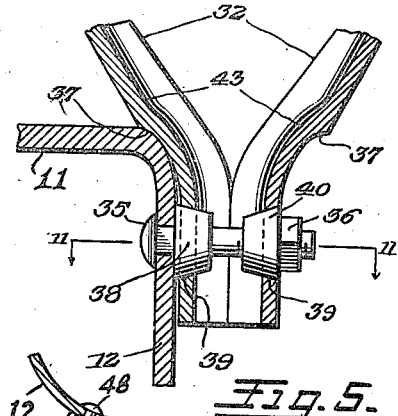
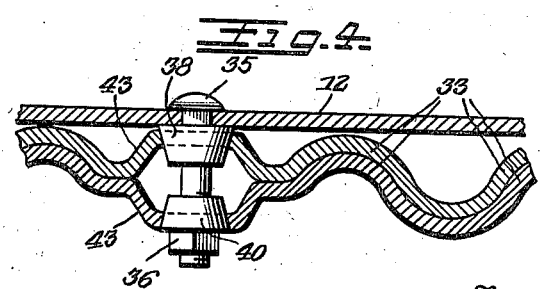
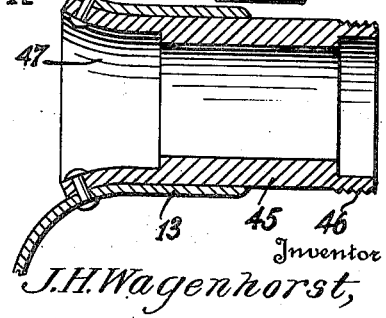
Inventor
J. H. Wagenhorst,
By Church & Church
Attorneys Patented Mar. 12, 1935

1,994,375

UNITED STATES PATENT OFFICE 1,994,375

VEHICLE WHEEL

James H. Wagenhorst, Detroit, Mich.

Application August 4, 1927, Serial No. 210,622
Renewed November 17, 1934

1 Claim. (Cl. 301—36)

My invention relates to improvements in vehicle wheels, and has to do, more particularly, with the construction of automobile wheels of the type adapted to carry a pneumatic tire.

The general use of low pressure or balloon tires upon automobiles has resulted in a decrease in the diameter and an increase in the width of the rim base of demountable rims, and such rims are stronger and more rigid than those formerly used. Coincident with the adoption of low pressure tires for general use, has been the adoption of four wheel brakes so that both the front and rear wheel hubs have brake drums fastened thereto. This has resulted in a considerable increase in the unsprung weight of the automobile. The principal object of my invention is to reduce the weight of the wheel and brake drum assembly, and thus reduce the unsprung weight, by providing a wheel construction in which the demountable rim is detachably connected directly to the brake drum, without the interposition of the usual spoke and felly parts. A further object of my invention is to decrease the cost of construction of wheels, by a structure having fewer parts and using less material. A further object of my invention is to provide a wheel construction in which a demountable rim is directly mounted on and connected to the brake drum, and in which the forces acting on the wheel, such as sidethrust, load and torque are transmitted adequately from one of these parts to the other. A further object of my invention is to provide a wheel construction having means for mounting dual rims directly on the brake drum so as to provide a wheel on which two tires can be mounted side by side, forming a dual tire assembly such as is frequently used in connection with motor coaches and other similar motor vehicles designed for carrying large loads.

Further objects, and objects relating to details and economies of construction and operation will definitely appear from the detailed description to follow. In one instance, I accomplish the objects of my invention by the devices and means set forth in the following specification. My invention is clearly defined and pointed out in the appended claim. A structure constituting a preferred embodiment of my invention, is illustrated in the accompanying drawing, forming a part of this specification, in which:

Fig. 1 is a vertical, sectional view through a portion of a wheel embodying my invention and provided with dual rims directly connected to the brake drum.

Fig. 2 is a fragmentary view showing said wheel in front elevation.

Fig. 3 is a detail, sectional view taken on the line 10—10 of Fig. 2.

Fig. 4 is a detail, sectional view taken on the line 11—11 of Fig. 3.

Fig. 5 is a detail, sectional view through a portion of the brake drum and a front hub, showing the means for connecting said brake drum to the hub.

Referring to the drawing, I have shown, in Figs. 1 to 5, inclusive, wheel structure constituting a preferred embodiment of my invention. More particularly, and with reference to Figs. 1, 3 and 4, in which the dual rear wheel arrangement is illustrated, the structure comprises a hub 10 to which a brake drum is secured, said brake drum having the usual cylindrical flange 11 and side wall 12, the center portion of which latter is extended in the form of a sleeve 13, fitting over the hub 10. The rims are mounted upon the bolts 35 and are preferably formed from a flat mill sheet having a projection 20 rolled therein. This sheet is coiled into an annulus and the ends are welded to form the sheet into a hoop. The portion of the hoop which ultimately forms the integral flange 32 is then pressed inwardly into proper radial form. Of course, the diameter of the inner edge of the flange 32 is much less than the diameter of the hoop from which it is formed, and the inward bending thereof is accompanied by buckling which is taken up by the formation of the corrugations 33. Each of the tire carrying rims has a rim base 17, with a side flange 18 and a portion 19, which, with the annular ridge 20, forms a gutter to receive the detachable side flange 21. In this embodiment, however, the integral flange 32 extends inwardly and laterally of the rim from the gutter and is provided with radial corrugations 33. The inner portion of each flange 32 extends parallel to the central plane of the rim, as shown at 34. Two of these rims are mounted upon the outer periphery of a brake drum, in reversed relation with respect to each other, so that the gutters and detachable side flanges of the two rims face each other. The inner portion of the flange 32 of each rim is provided with an annular shoulder 37, and the rear rim is mounted with such shoulder seating upon the outer periphery of the brake drum, as shown in Fig. 3. In addition to the corrugations 33, the flange 32 is provided with broader ribs or corrugations 43 provided with countersunk bolt holes 39. The front rim is mounted in position with the corrugations 33 in its flange 32 nested in the corrugations 33 of the flange on the rear rim, and with the ribs 43 opposite each other, as shown in Fig. 4. Bolts 35, carried by and extending through the side wall 12 of the brake drum, are provided with conical shoulders 38 fitting the countersunk holes 39 in the flange of the rear rim. The bolts 35 extend through the bolt holes 39 formed in the flange of the front rim, and nuts 36, screwed on the ends of the bolts, are provided with conical or convex faces 40 which engage in the countersunk bolt holes 39 formed in the flange of the front rim. In this way, the inner portions of the two flanges are clamped together and in seating position upon the periphery of the brake drum, and the two rims are thus mounted directly upon the brake drum with the rims sufficiently spaced to receive two tires thereon, without interference with each other, while the forces acting upon the tires, such as load, sidethrust and torque, are directly transmitted from the rims to the brake drum, or vice versa, without the interposition of the usual spoke and felly structures. The rims are demountably fastened to the brake drum, so that either, or both, of the rims can be removed as desired.

In Fig. 5, I have shown a hub construction for the front wheel. This hub 45 is provided with recesses 46 and 47, at the opposite ends thereof, for receiving the usual front wheel bearings. The flange forming the outer wall of the recess 47 is extended somewhat and the rivets 48 extend through said flange and through the portion 13 of the brake drum to fasten the same in place upon the hub.

The wheel construction which I have described is one which greatly reduces the unsprung weight of an automobile, as the usual wheel parts, such as spokes and felly, are eliminated and the demountable rim is directly connected to the brake drum by means of the integral flange of the rim, the forces acting on the rim being transmitted directly to the brake drum. This results in a decreased cost of manufacture and a decreased weight for the wheel structure, both of which are decided advantages in the manufacture of wheels.

I am aware that the particular structure disclosed herein may be varied considerably without departing from the spirit of my invention and, therefore, I claim my invention broadly, as indicated by the appended claim.

What I claim is:

A dual wheel construction for vehicles comprising a hub having a radial flange, bolts anchored in said flange and extending axially outwardly therefrom, a pair of similar wheel discs mounted upon said hub and bolts, each of which discs is of dished form and has a plurality of spoke-like embossments formed therein, one of said discs being disposed with its spoke-like embossments facing axially inwardly and seating against said flange, the other of said discs being reversely disposed upon said hub and having its spoke-like embossments in radial alinement with those of the first disc and facing axially outwardly providing resilient tubular portions through which said hub bolts extend, and nuts threaded upon said bolts and clamping said tubular portions together upon said bolts, securely locking said wheel discs, flange and nuts in vibration-proof assembly by reason of the resiliency of said embossment-constituted tubular portions.

JAMES H. WAGENHORST.